April 5, 1949.  R. A. RUSCA ET AL  2,466,615
PHOTOELECTRIC APPARATUS FOR MEASURING LAP
UNIFORMITY HAVING MEANS TO MINIMIZE
TENSION ON THE LAP
Filed Nov. 12, 1946  3 Sheets-Sheet 1

INVENTORS
R. A. RUSCA
C. L. SENS

BY
H. N. Foss
L. M. Mantell
ATTORNEY

April 5, 1949.  R. A. RUSCA ET AL  2,466,615
PHOTOELECTRIC APPARATUS FOR MEASURING LAP
UNIFORMITY HAVING MEANS TO MINIMIZE
TENSION ON THE LAP
Filed Nov. 12, 1946  3 Sheets-Sheet 2

INVENTORS
R.A. RUSCA
C.L. SENS

April 5, 1949.  R. A. RUSCA ET AL  2,466,615
PHOTOELECTRIC APPARATUS FOR MEASURING LAP
UNIFORMITY HAVING MEANS TO MINIMIZE
TENSION ON THE LAP
Filed Nov. 12, 1946  3 Sheets-Sheet 3

INVENTORS
R.A. RUSCA
C.L. SENS

BY

ATTORNEY

Patented Apr. 5, 1949

2,466,615

UNITED STATES PATENT OFFICE 2,466,615

PHOTOELECTRIC APPARATUS FOR MEASURING LAP UNIFORMITY HAVING MEANS TO MINIMIZE TENSION ON THE LAP

Ralph A. Rusca and Charles L. Sens, New Orleans, La., assignors to The United States of America as represented by the Secretary of Agriculture Application November 12, 1946, Serial No. 709,108

7 Claims. (Cl. 88—14)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to methods of and apparatus for determining the uniformity of textile mill picker laps.

In the art of manufacturing textiles, the desirability of producing picker laps uniform in density throughout is well known. In the subsequent processes leading to the manufacture of yarns and fabrics, such as carding, drawing, and spinning, the uniformity of the picker lap is a major factor in determining the quality of the finished material, and is also a factor in determining production.

A picker lap is composed of layers of cotton, or other textile staple fiber, wound in a cylindrical fashion on a "lap pin," similar to the way a roll of paper is wound on a wood core. Unlike thin highly compressed paper, the picker lap layer is composed of a bat of loosely entangled cotton fibers whose longitudinal axes are not oriented in any specific plane. The cotton bat may range from ¼ inch to more than 1 inch in cross-sectional thickness, dependent upon the moisture content and character of the fiber, desired weight per linear yard of lap, pressure exerted on the lap pin, and other factors.

In addition to the variations in thickness, lap uniformity varies considerably in weight per square inch of surface. One edge of the lap is frequently more dense than the other, and variations in density often appear in lengthwise cycles of several inches to several yards.

From the foregoing, it is obvious that weighing one yard from the outside end or the inside end of a lap roll, or weighing several one-yard samples throughout a lap roll, will not reveal the true condition of lap uniformity. Nevertheless, in the textile industry the uniformity of picker laps is customarily measured by weighing a linear yard of the lap. In most mills this a accomplished by unrolling the lap on a floor or table, cutting or pinching out a yard of the lap, and weighing it on a suitable scale. One or several samples may be taken in an average 50-yard length of lap. Another popular method utilizes a machine for unrolling, cutting off, and weighing 1-foot or 1-yard increments.

In these, and other known methods, the continuity of the lap is destroyed, and hence the lap cannot be used in the subsequent carding process. It is therefore necessary to return the mutilated lap to the opening or picking room for reprocessing.

The object of this invention is to provide a method and apparatus for determining the uniformity of textile mill picker laps in a continuous process, without any detrimental effect on the laps.

A further object of the invention is to provide a permanent, visible record of the uniformity of all laps tested.

Other objects, advantages, and uses of the invention will become apparent from the following description, in conjunction with the accompanying drawing, in which Figure 1 is a three-dimensional view of one form of the apparatus, part of the side being broken away for clarity.

Figure 1:
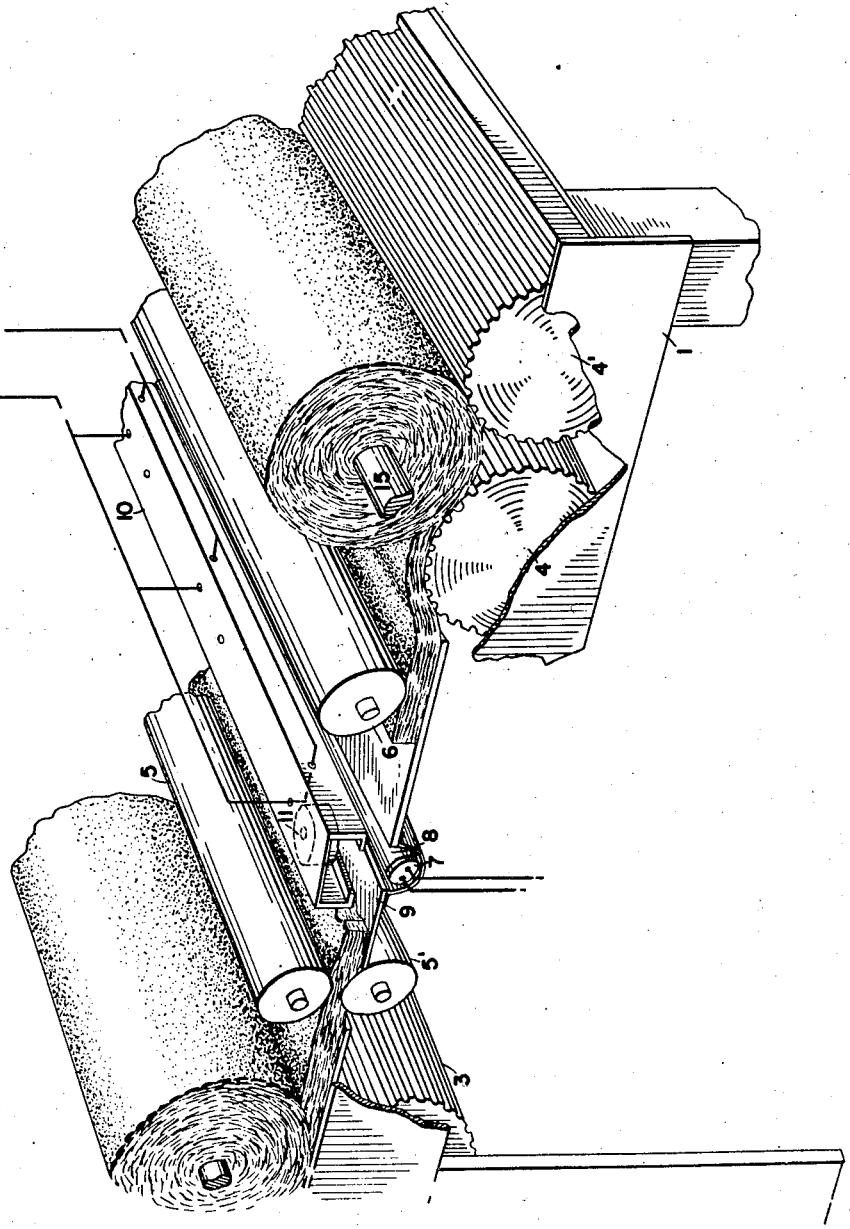
Figure 2:
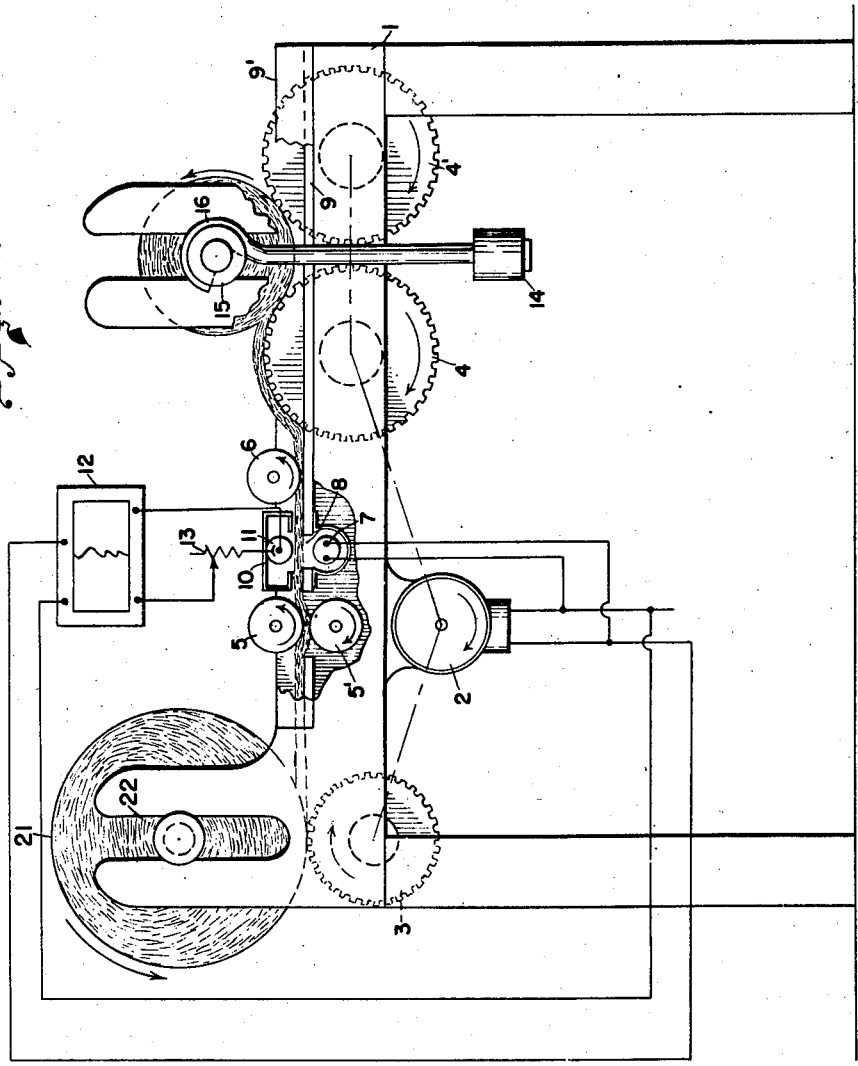
Figure 2 is a side elevational view.

Referring particularly to Figure 2, the embodiment illustrated comprises a frame 1 of structural steel on which is mounted a fractional horsepower reduction-geared electric motor 2. Supported on the frame by means of standard anti-friction bearings, not shown, are fluted rolls 3, 4, and 4', and smooth rolls 5 and 5'. These rolls are rotatably driven by means of chain and sprockets or gears from motor 2 in the directions indicated. The revolutions per minute of the several rolls are such that their surface speeds are indentical, thereby avoiding tension on the picker lap as it is being unrolled. The top surface of roll 5' is located flush with the surface of the table, and rolls 5 and 6 are exactly the same height above the table. Roll 6 is a smooth freely rotating roll located immediately adjacent to box 10 that encloses the photocell equipment to be described. Rolls 5, 5', and 6 cooperate to reduce the picker lap to a predetermined thickness as it passes under enclosure 10. This feature is important because, as previously mentioned, picker laps vary widely in thickness due to factors beyond control of the operator.

A suitable source of light 7, preferably a fluorescent tube encased in a reflector, is located under a series of holes or other suitable aperture 8 cut in a polished plate 9 which forms a table top for frame 1. The plate 9 is turned up at the edges to provide 1-inch selvages 9' at each side. Above the aperture 8 is mounted a box 10 that serves the function of excluding extraneous light from the top surface of the lap other than that transmitted from the light source 7. The bottom of box 10 is open and may be at the same height from the plate 9 as are the bottom surfaces of rolls 5 and 6.

Disposed within the box 10 is a row of photoelectric cells 11 or other light-sensitive devices which are connected in an electrical circuit. The summation of the electrical energy output of these photoelectric cells, hereafter called cells, is fed to a suitable single point recording potentiometer 12. If a limited number of cells are used, it will be found advantageous to interpose a vacuum tube amplifier unit not shown between the cells 11 and the recorder 12. A rheostat 13 or potentiometer or other suitable current regulating device is used for adjusting the output of the cells to compensate for the different weight of laps that are to be tested.

A weight 14 is supported from the conventional lap pin 15 by means of lever 16 or by a conventional yoke and saddle arrangement. Sufficient weight is maintained on the rotating lap pin to reroll the lap to its original density.

In operation, the picker lap feed roll 21 is placed in position in the guide 22 over roll 3. The lap is fed at a predetermined rate between the rolls 5 and 5', under the cells 11, under roll 6, and is wound up on the lap pin 15 at a predetermined pressure exerted by lever 14. As the lap passes between the light source 7 and the cells 11, the varying densities across the lap are converted into electrical energy, which actuates the mechanism of the recorder to produce a graphic record. The lap may be run at speeds up to 5 or more yards per minute which, when recorded at a speed of 1 inch of chart per 1 yard of lap, gives an adequate record of lap uniformity. Of course, other chart speeds and lap speeds may be used if desired.

The advantages of the invention over prior methods of measuring lap uniformity are several. The apparatus measures the uniformity of the lap over its continuous length, and provides a permanent, visible and continuous record of each lap tested. Such a record instantly reveals to the picker lapper operator any discrepancies in uniformity, thereby indicating required adjustments for proper functioning of the picker room machinery. Furthermore, with this invention there is no physical injury to the lap, and hence no loss of production due to the necessity of reprocessing mutilated laps.

While the invention has been described as using a graphic recorder for producing a charted record, it is entirely feasible to use other types of indicators in lieu of the recorder. A direct reading meter, such as a D. C. microammeter with zero center scale, or other electrical means such as low current neon lights may be used successfully.

Figure 3:
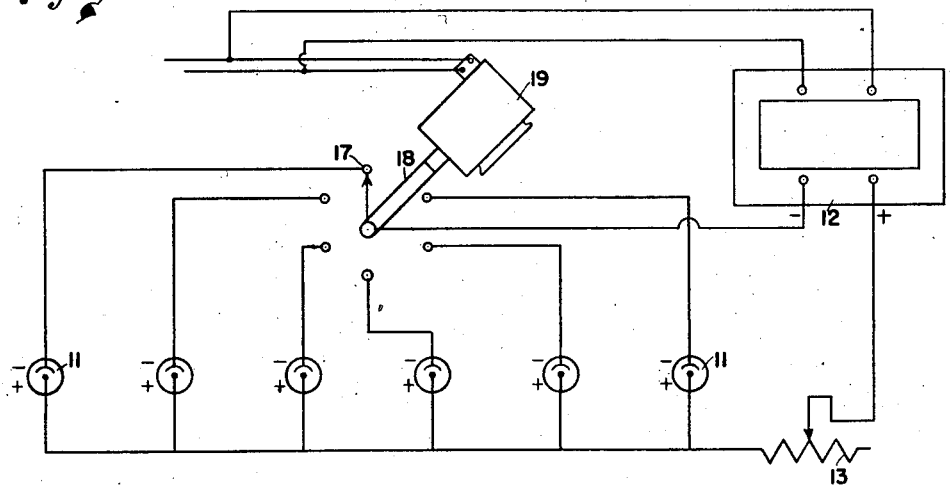
Figures 3 and 4 are diagrammatic views of additional embodiments of the apparatus of the invention.

Under certain conditions it may be desirable to test the uniformity of the lap over its width, rather than its length. Figure 3 illustrates the manner whereby the embodiment previously described may be modified to accomplish this. A multiple point rotary selector switch 17 is connected in the electrical circuit of cells 11, with each tap of the switch connected to a separate cell and with the output of the switch connected to the recorder. The shaft 18 of the switch may be rotated by means of a very slow speed miniature electric motor 19. Other suitable means such as driving through reduction gears from motor 2 might also be employed. Manual switching may be utilized with satisfactory results. In either method, the switch is rotated to connect the cells in sequence across the lap; thus the recorder will register the uniformity of lap width. The lap may be moving at a predetermined rate, or it may be stationary when the measurements are made. In this application it is preferable that the light sensitive devices be matched for sensitivity and linearity of spectral response. Obviously, any number of cells can be spaced across the lap, but for a 40-inch wide lap 6 cells spaced on approximately 6 inch centers will be found to provide a sufficiently adequate record.

Figure 4:
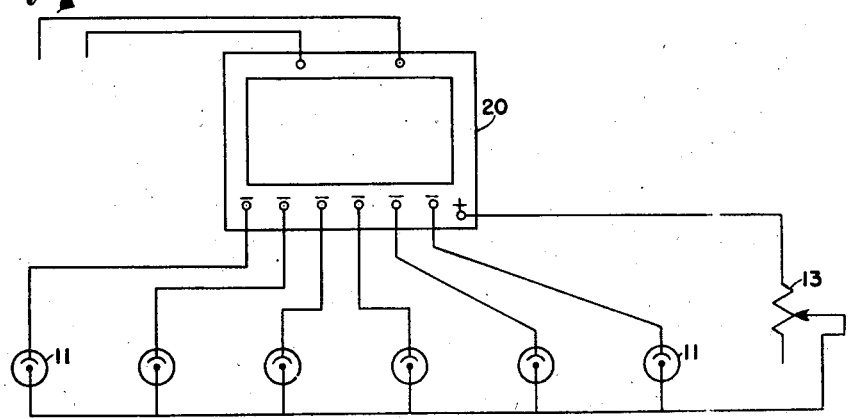

A conventional multiple-point automatic recorder 20 can be used as a substitute for the switching arrangement described above. Figure 4 illustrates this type of unit, wherein 20 is a six-point graphic recorder, connected as shown to cells 11. Such a recorder has incorporated into it a device for automatically switching on the individual cells in sequence at predetermined time intervals, thereby providing a separate record of lap uniformity at each point where a cell is located.

While the invention has been described in connection with textile lap uniformity, its use is not restricted to this application. Uniformity of paper, rayon, and cotton bats, webs and fabrics and like materials are within the scope of this invention.

The invention is not limited to use of the apparatus shown in the drawings. The process may be carried out in modified apparatus. For example, the cylindrical friction rollers may be replaced, in part or entirety, by moving endless belts, conveyors, and the like.

Having thus described our invention, we claim:

1. An apparatus for determining variations in the uniformity of a textile mill picker lap, which comprises a plate for supporting the lap, said plate providing an aperture; a light source positioned to project a beam of light through said aperture; a light-sensitive means to receive said beam after it passes through said aperture; power operated lap advancing and withdrawing means for interposing a thickness of lap between the light source and the light-sensitive means, the advancing and withdrawing means moving the lap at the same speed, to minimize tension, and means for maintaining a uniform thickness of the lap at the aperture, said latter means comprising a free roller adjacent the aperture and spaced at a predetermined distance from the plate; and means operated by the light-sensitive element to indicate the variations in uniformity.

2. The apparatus defined in claim 1, in which the said latter means includes two driven spaced rollers on the lap-feeding side of the aperture, between which rollers the lap passes, and in which the free roller is at the exit side of the aperture the two driven spaced rollers rotating at the same surface speed as the lap advancing and withdrawing means.

3. The apparatus defined in claim 1, in which the light source extends substantially across the width of the lap, the light-sensitive means comprises a number of photo-electric cells likewise extending across the width of the lap, and the means operated by the light-sensitive means comprises a single-point graphic recorder.

4. The apparatus defined in claim 1, in which the light source extends substantially across the width of the lap, the light-sensitive means comprises a number of photo-electric cells likewise extending across the width of the lap, and the visual indicating means is operated by the light-sensitive means through a multiple point selector switch by which the cells are connected to the indicator in sequence across the lap, thereby indicating variations in uniformity across the lap as well as lengthwise of the lap.

5. An apparatus for determining variations in the uniformity of a textile mill picker lap, which comprises a plate to support the lap, an aperture in said plate, a light source positioned to project a beam of light through said aperture, a light-sensitive element to receive said beam after it passes through said aperture, means for interposing a thickness of lap between the light source and the light-sensitive element, the light-sensitive element being actuated by the light passing through the opposite faces of the lap means operated by the light-sensitive element to indicate the variations in uniformity, said means for interposing a thickness of lap comprising a feed lap roll supported by and resting upon a friction roller placed under the feed lap roll, which friction roller unrolls the lap roll and advances the lap over the plate toward the light source, and a second lap roll supported by and resting upon a rotating friction element placed under the second roll, which rotating element re-rolls the lap on the said second roll, both said friction roller and friction element moving the lap at the same linear speed, whereby substantially no stretch is imparted to the lap.

6. The apparatus defined in claim 5, and having means for maintaining a uniform thickness of the lap at the aperture, said latter means comprising a free roller adjacent the aperture and spaced at a predetermined distance from the plate.

7. The apparatus defined in claim 5, and having means for maintaining a uniform thickness of the lap at the aperture, said latter means comprising spaced rollers placed adjacent said aperture and between which rollers the lap passes before it reaches the aperture.

RALPH A. RUSCA.
CHARLES L. SENS.

REFERENCES CITED

The following references are of record in the file of this patent:

UNITED STATES PATENTS

| Number | Name | Date |
| --- | --- | --- |
| 817,026 | White | Apr. 3, 1906 |
| 888,974 | Dublin | May 26, 1908 |
| 1,915,204 | Scheibli et al. | June 20, 1933 |
| 1,963,310 | Nichols | June 19, 1934 |
| 2,238,762 | Whitaker | Apr. 15, 1941 |
| 2,299,983 | Hertel | Oct. 27, 1942 |
| 2,356,660 | Deuel | Aug. 22, 1944 |
| 2,361,217 | Lewis | Oct. 24, 1944 |
| 2,433,557 | Hurley | Dec. 30, 1947 |